Patented July 27, 1926.

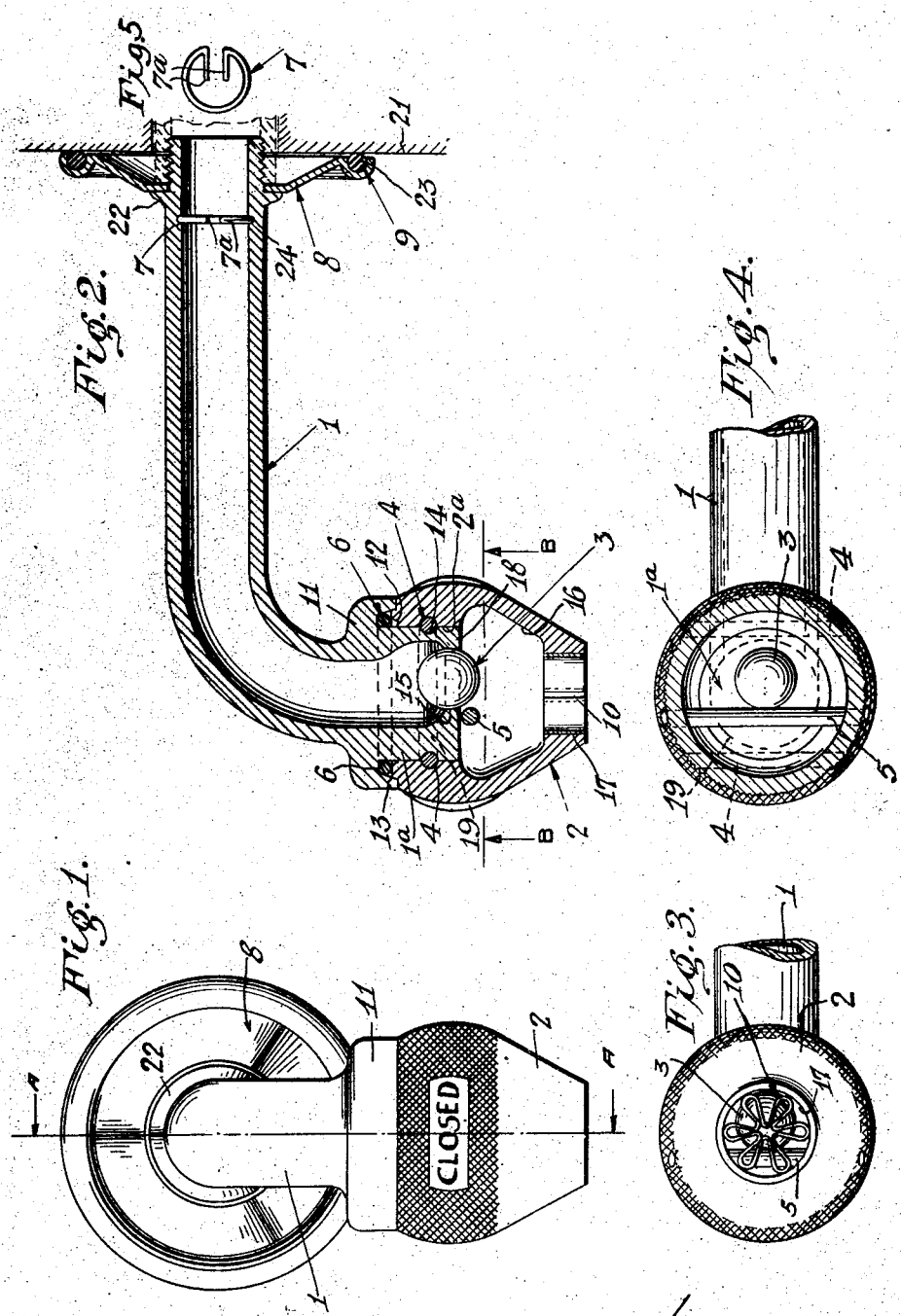

1,593,968

UNITED STATES PATENT OFFICE.

JOHANN JAKOB HEINRICH EDLING, OF DETROIT, MICHIGAN.

FAUCET.

Application filed August 6, 1924. Serial No. 730,502.

My invention relates to improvements in faucets, and it consists in the combinations, constructions and arrangements herein described and claimed.

An object of the invention is the provision of a faucet having reliable and efficient means for controlling the flow of water from the faucet so that the flow of water will be stopped instantly when the faucet is closed and water may flow from the faucet smoothly and in a uniform stream when the faucet is open.

A further object of the invention is the provision in a faucet of the character described of simple, reliable and quickly and easily operated means for controlling flow of water from the faucet.

A still further object of the invention is the provision of a faucet having efficient means for preventing leakage between relatively movable parts of the faucet.

A still further object of the invention is the provision in a faucet of a novel means for limiting movement of the ball valve which is comprised in the faucet in one direction along the bore of the tubular body of the faucet without any appreciable interference with the flow of liquid through the body of the faucet toward the ball valve.

A still further object of the invention is the provision of a faucet having a flexible disk adapted to yieldingly contact adjacent to its outer edge with a vertical wall through which an end portion of the tubular body of the faucet may extend and which is adapted to conceal the joint between the body of the faucet and the inlet pipe and is adapted to remain continuously in contact with said wall.

Other objects and advantages of the invention will be apparent from the following description, considered in conjunction with the accompanying drawings, in which—

Figure 1 is a front end view of the improved faucet with the means for controlling flow of water from the faucet closed, Figure 2 is a longitudinal vertical section through the faucet, substantially along the line A—A of Figure 1, Figure 3 is a bottom end view, showing the outer end of a faucet, and Figure 4 is a section substantially along the line B—B of Figure 2.

The improved faucet comprises a tubular body 1, the outer end portion of which is turned downwardly substantially at right angles to the remainder of the tubular body and is enlarged externally adjacent to its lower end as indicated at 1$^a$, said enlargement having an outwardly extending flange 11 at its upper end. The enlarged lower end portion 1$^a$ at the outer end of the tubular body 1 of the faucet is circular in external cross sectional configuration and rotatably supports a pendant tubular discharge head section 2, the upper end portion of which has a bore, indicated at 2$^a$ which is circular in cross section and in which the enlarged end portion 1$^a$ of the tubular body of the faucet below the flange 11 is received. The tubular head section 2 has an externally reduced annular upper end portion 12 which enters a circular groove or rabbet 13 in the lower face of the flange 11 and presses a rubber gasket or packing ring 6 against the wall of the groove 13 to prevent leakage between the parts 2 and 11 of the faucet.

The rotary head section 2 is held against axial movement on the enlarged end portion 1$^a$ on the body of the faucet by a pair of lateral retaining members 4 which are carried by the upper end portion of the head section 2 at opposite sides of the latter and are in sliding contact with a groove 14 which extends around the outer wall of the enlarged end portion 1$^a$ of the body of the faucet. The retaining members 4 may be horizontal pins which are partly received in grooves or slots 15 in the inner wall of the upper end portion of the discharge head 2 of the faucet and protrude from the slots 15 into the groove 14 in the inner wall of the enlarged end portion of the body 1 of the faucet.

The rotary member 2 is formed internally to provide a chamber 16 beneath the outer end of the enlarged portion 1$^a$ of the body of the faucet and the member 2 then is reduced to provide an outlet or discharge opening 17 at the lower end of the chamber 16, the outlet opening 17 being of less area in cross section than the adjacent portion of the chamber 16. A stream spread preventer 10 fits in the outlet opening 17 of the member 2 and is formed of a strip of metal bent to provide radially extending horizontal loop portions as clearly shown in Figure 3, such loop portions being in contact at their outer ends with the inner wall of the outlet opening 17.

The bore of the body 1 of the faucet turns slightly rearwardly at its outer end and the enlarged end portion 1ª of the body of the faucet is formed with an internal enlargement or flange 18 at its free end, this flange being beveled as indicated at 19 to provide a seat for a ball valve 3. This valve seat 19 is eccentric to the outer wall of the enlarged portion 1ª of the body of the faucet and has a diameter slightly less than that of the ball valve 3. The portion of the bore of the body 1 of the faucet that is directly above the valve seat 19 has a diameter greater than that of the ball valve 3 so that the latter can move upwardly from its position on the seat 19 and a space will be provided between the ball valve and the tubular body 1 for the flow of water past the ball valve and through the valve seat into the chamber 16 and thence through the spaces between adjacent portions of the spread preventer member 10 that is disposed in the outlet opening 17. When the ball valve 3 is on its seat 19, it depends through the seat below the level of the flange 18. A lifter pin 5 extends transversely of the chamber 16 above the level of the lowest portion of the ball valve 3 when the ball valve is on its seat. This lifter pin 5 will be disposed at one side of the portion of the ball valve that depends below the seat 19 when the member 2 is in the position shown in Figure 2 but when the member 2 is rotated on the enlarged portion 1ª of the body of the faucet, the lifter pin 5 will move against the lower portion of the ball valve 3 and will force the latter upwardly from its seat, thus permitting liquid to flow through the seat 19 between the ball valve and the inner wall of the tubular body of the faucet. When the member 2 has again been turned to the position shown in Figures 1 and 2 on the portion 1ª of the body of the faucet, the ball valve 3 will move by gravity to position on its seat and this movement of the ball valve against its seat will be aided by the pressure of liquid in the bore of the tubular body 1 of the faucet so that such return movement of the ball valve from open position to position against the seat will be practically instantaneous.

The inner end portion of the body 1 of the faucet is adapted to extend through an opening 20 in a vertical wall which is shown more or less diagrammatically at 21 and this inner end portion of the body 1 of the faucet may be adapted for connection with a suitable water supply pipe, not shown, in any suitable known manner. The convexoconcave disk 8 fits on the inner end portion of the body 1 against the flange 22 on the inner end portion of the tubular body 1, this disk 8 being made of light gauge more or less resilient metal and having the outer edge portion thereof curved arcuately transversely thereof as indicated at 23 to provide a seat for a rubber packing ring or gasket 9 which thus is yieldingly held against the wall 21.

Movement of the ball valve 3 along the bore of the faucet toward the inner end of the latter is limited when the faucet has been detached from its connection by a split ring 7 which is made of spring material and which fits in a groove 24 in the inner wall of the body 1 adjacent to the inner end of the latter, the split ring 7 having inwardly extending stop portions 7ª which may be the ends of the spring member of which the split ring 7 is composed.

From the foregoing description of the various parts of the device, it will be obvious that the invention provides a faucet which is simple in construction, reliable in use, easily operated, and thoroughly practical commercially.

I claim:—

1. A faucet comprising a tubular body having the outer end portion thereof turned downward and fashioned to provide an internal valve seat, a ball valve adapted to rest on said valve seat, the bore of said tubular body above said valve seat having a diameter greater than that of said ball valve, a rotary tubular member carried by the outer end portion of said tubular body, means carried by said rotary tubular member adapted to engage with the lower portion of said ball valve, when said ball valve is on its seat and said rotary member has been turned from a certain position, to force said ball valve upwardly from its seat, and means connecting said rotary member with the outer end portion of said tubular body for preventing axial movement of the tubular member relatively to said tubular body without preventing rotation of said rotary member.

2. A faucet comprising a tubular body having the outer end portion thereof turned downward, the outer end portion of said tubular body being enlarged and being formed with an outwardly extending flange spaced from its extremity, a tubular discharge head having the upper end portion thereof encircling the outer end portion of the tubular body below said flange, said tubular discharge head having an externally reduced upper end portion disposed in an annular groove in the lower face of said flange, a packing member disposed in said groove between the wall of the latter and the externally reduced upper end portion of said rotary discharge head, said outer end portion of the body having a circumferentially extending groove in its outer wall, retaining members carried by said rotary discharge head in sliding contact with said groove in the outer wall of the outer end portion of the body, the outer end portion of said tubular body being formed internally to provide a valve seat at its extremity eccentric to said rotary discharge head, a ball valve adapted to rest on said valve seat and to depend through said valve seat below the level of the extremity of said tubular body, said ball valve being free to move upwardly within the bore of the tubular body above said valve seat, and a transverse pin extending within said rotary discharge head above the level of the lowest portion of said ball valve when said ball valve is on its seat and at one side of a diametrical line of said rotary discharge head, said pin being adapted when said discharge head is turned from a certain position to engage with the lower portion of said ball valve and to force said ball valve upwardly from its seat.

3. In a device of the character described, a tubular body adapted to extend through an opening in a wall, and a disk of light-gauge mounted on the inner end portion of said tubular body, said disk being convexo-concave with the concave face thereof turned toward the wall and having the edge portion thereof curved arcuately transversely thereof, the concavely curved face of said edge portion of the disk being turned toward said wall and being adapted to partially receive a packing ring.

4. In a device of the character described, a tubular body adapted to extend through an opening in a wall, a disk of light-gauge resilient material mounted on the inner end portion of said tubular body, said disk being convexo-concave with the concave face thereof turned toward the wall and having the edge portion thereof curved arcuately transversely thereof, the concavely curved face of said edge portion of the disk being turned toward said wall and an endless deformable packing member partly received in said curved outer edge portion of the disk and held by the latter against said wall.

5. A faucet comprising a tubular body having a down-turned outer end portion and having an internal valve seat adjacent to its outer end, a ball valve adapted to move along the bore of said tubular body and to rest on said valve seat, said tubular body having an internal groove adjacent its inner end, and a split ring stop engaged in said internal groove and having inwardly extending end portions.

J. J. H. EDLING.